United States Patent [19]
Jarvis

[11] 4,018,329
[45] Apr. 19, 1977

[54] ABRASIVE RECOVERY SYSTEM
[75] Inventor: James Dean Jarvis, Houston, Tex.
[73] Assignee: Safety Steel Service, Inc., Victoria, Tex.
[22] Filed: Feb. 13, 1976
[21] Appl. No.: 657,737
[52] U.S. Cl. .............................................. 198/743
[51] Int. Cl.² ........................................ B65G 25/08
[58] Field of Search .......... 198/221, 224, DIG. 18, 198/741, 743, 746; 51/8 R, 8 BR, 9 R, 9 M; 214/17 R, 17 A, 17 D

[56] References Cited
UNITED STATES PATENTS

| | | | |
|---|---|---|---|
| 961,486 | 6/1910 | Dewey | 198/224 |
| 2,381,185 | 8/1945 | Rogers et al. | 198/224 |
| 2,964,126 | 12/1960 | Peterson | 198/224 |
| 3,184,044 | 5/1965 | Allen et al. | 198/221 |
| 3,306,435 | 2/1967 | Wenger | 198/224 |
| 3,790,007 | 2/1974 | Sprague | 198/224 |

Primary Examiner—Evon C. Blunk
Assistant Examiner—Joseph E. Valenza
Attorney, Agent, or Firm—David M. Ostfeld; Ned L. Conley; Murray Robinson

[57] ABSTRACT

A system for the removal and recovery of spent abrasives from an abrasive blasting system including a floor having a collection channel with a longitudinally extending frame thereon. The frame supports a grating and has rails for slidingly engaging a reciprocally driven drive member and a blade support member. The blade support member has a plurality of bars laterally crossing the frame on which are supported a plurality of sweeping blades. As the drive member reciprocally slides along the rails it engages the blade support member causing the blades to sweep the abrasives toward the channel. The blades are adapted for pivoting and will pivot as the drive member reciprocates so that they engage the abrasives when moving toward the channel, and pivot away from the abrasives when moving from the channel. A suitable abrasive removal device may be used in the collection channel to carry the abrasives to a desirable collection location.

7 Claims, 7 Drawing Figures

U.S. Patent  April 19, 1977  Sheet 1 of 4  4,018,329
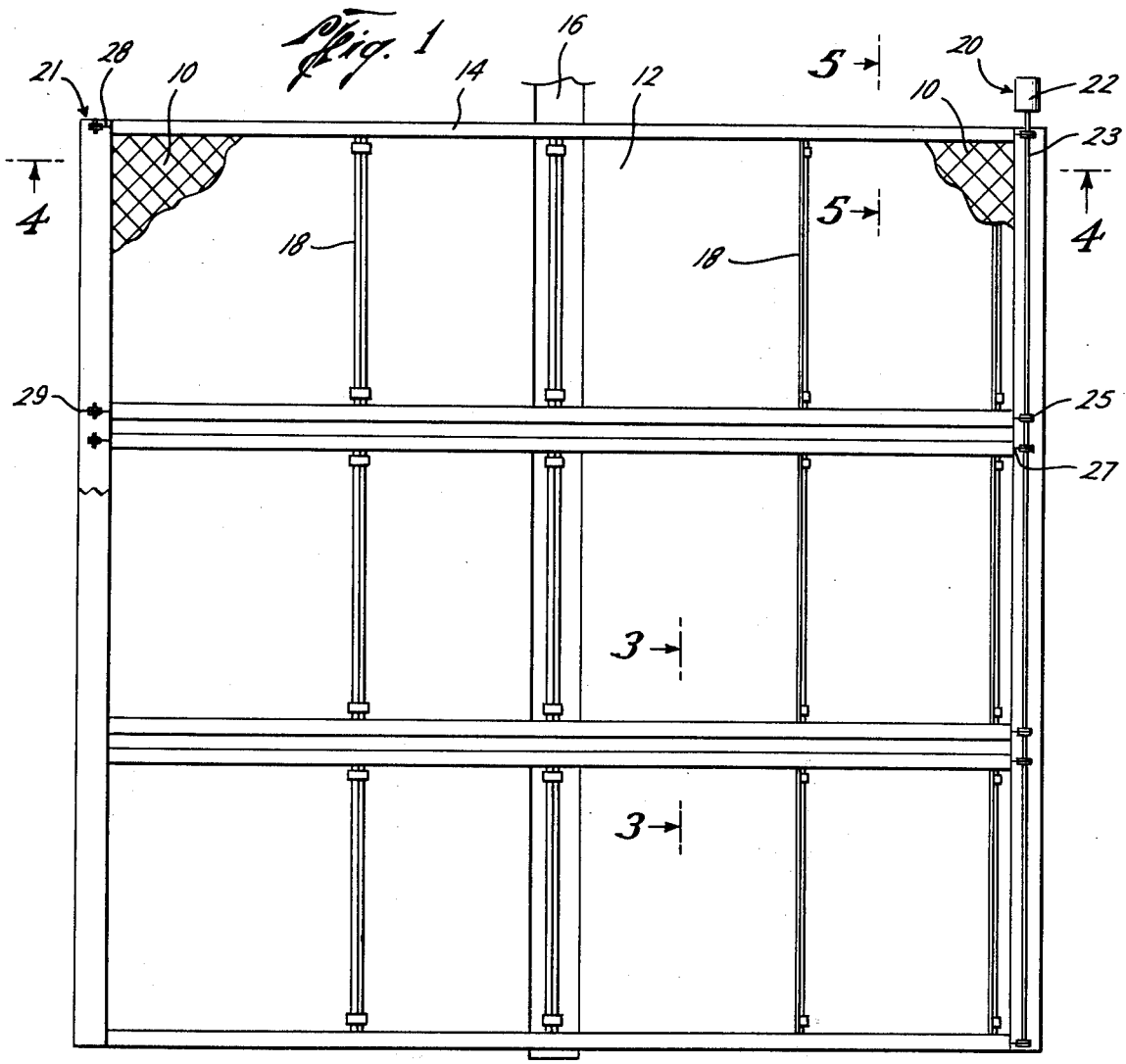
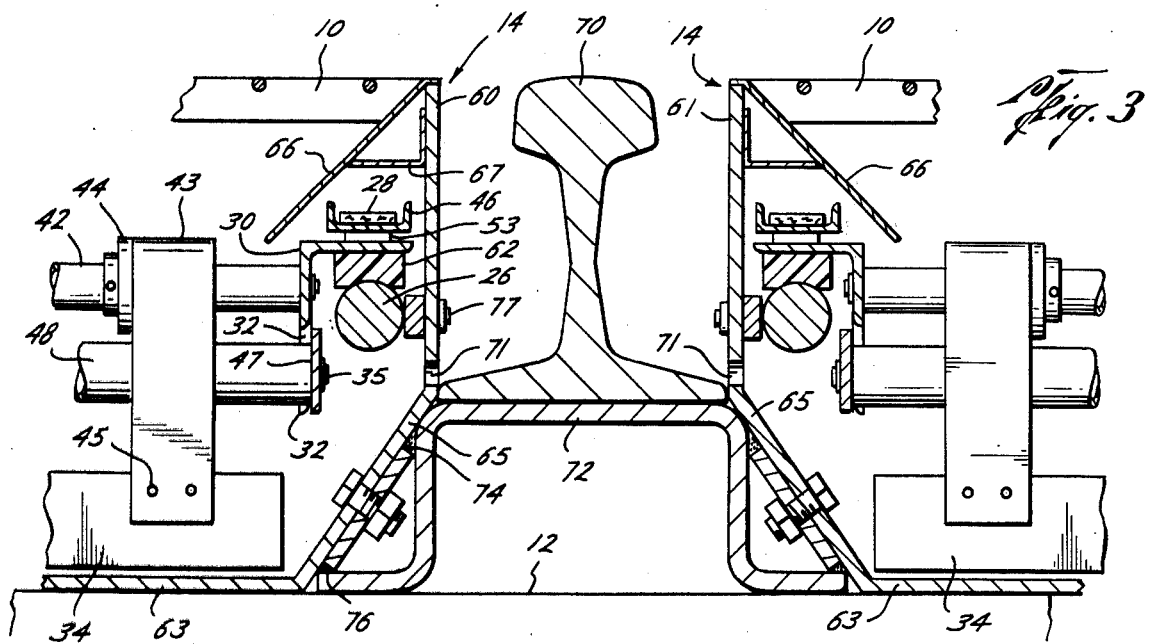

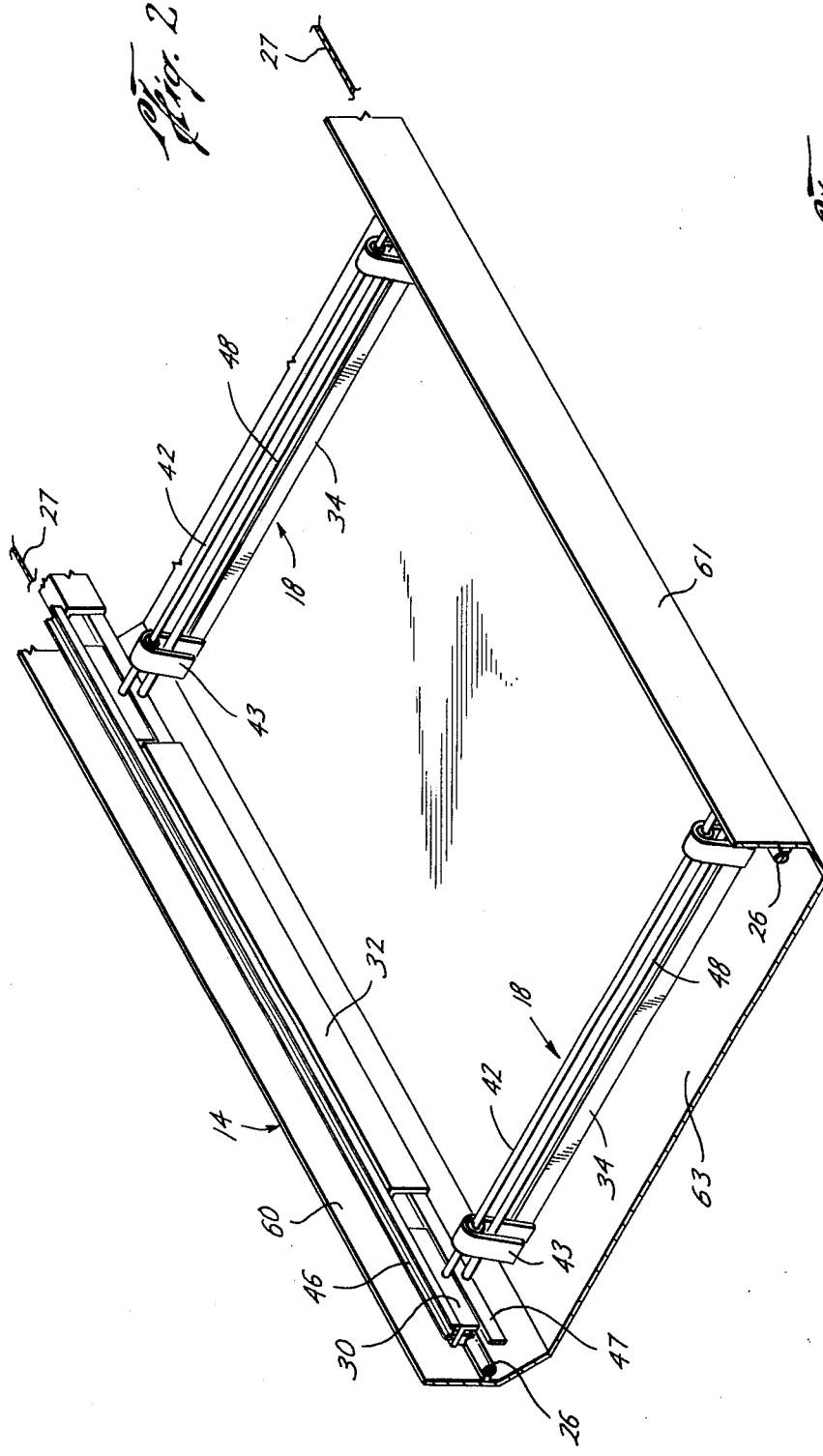
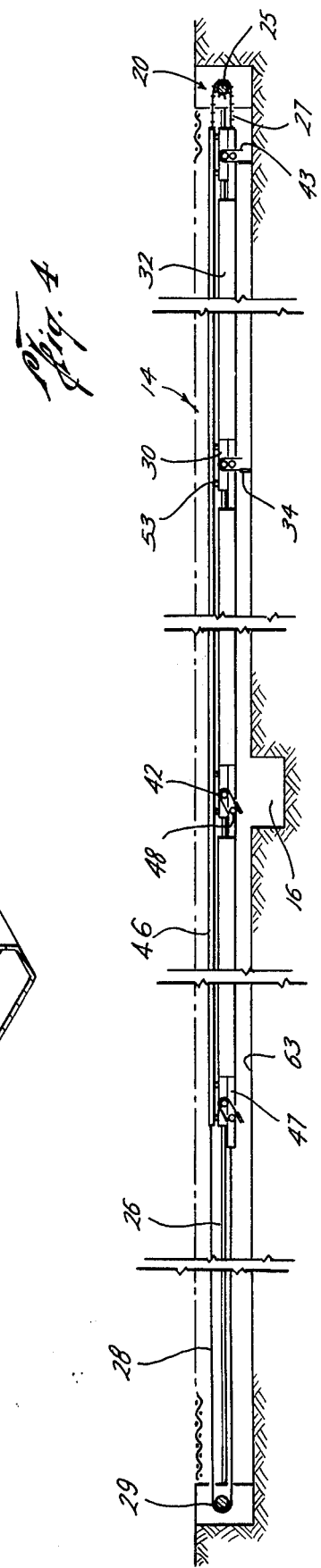

ABRASIVE RECOVERY SYSTEM

BACKGROUND OF THE INVENTION

1. Field of the Invention

This invention relates to devices for recovering spent abrasives used in an abrasive blasting apparatus.

2. Description of the Prior Art

Abrasive blasting systems are well known and have been used for many years to clean surfaces. Many abrasive blasting systems use sand as the abrasive and utilize various recovery schemes for removal and recovery of the sand. With the advent of the use of metallic abrasive particles, the need for recovery of these metallic particles became more important. Metallic abrasives are very expensive and can be re-used; thus, systems have been built to recover the spent abrasives. One such system is disclosed in the U.S. Pat. No. 3,790,007 to Sprague. This patent discloses an abrasive recovery system in which the spent abrasives fall through a perforated floor and are swept into a conveyor channel. This system utilizes a cable and pulley network for pulling the blades back and forth across the floor. The blades are retracted when moving away from the channel and engage the abrasives when moving toward the channel.

SUMMARY OF THE INVENTION

The present invention of a system for removing particulate matter is preferably used to remove and recover spent abrasives from an abrasive blasting system. The system includes a grating through which the particulate matter may fall and a solid floor beneath the grating. A collection channel crosses the floor and includes suitable conveyor means for carrying the particulate matter to be deposited for reuse. A set of frameworks is mounted on the floor traversing the collection channel. Each framework has rails for slidingly engaging a reciprocally driven drive member and a blade support member. The support member carries a plurality of sweeping blades depending downwardly therefrom toward the floor. The sweeping blades are adapted to pivot when the drive member reciprocates so that they engage the particulate matter when moving toward the channel and retract from the particulate matter when moving away from the channel.

This system is advantageous because it is highly efficient, simple to operate and easy to repair. Other features of the invention pointed out in the claims can best be illustrated by the following description of preferred embodiments of the invention.

BRIEF DESCRIPTION OF THE DRAWINGS

For a more detailed description of a preferred embodiment of the invention, reference will now be made to the accompanying drawings wherein:

FIG. 1 is a plan view of one embodiment of the invention showing only a portion of the grating;

FIG. 2 is an enlarged, isometric view of a portion of the embodiment of FIG. 1, the grating being omitted for clarity;

FIG. 3 is an enlarged fragmentary vertical sectional view taken along the line 3—3 of FIG. 1;

FIG. 4 is a vertical sectional view taken along the line 4—4 of FIG. 1 and showing the system in operation;

DESCRIPTION OF THE PREFERRED EMBODIMENT

Figure 5:
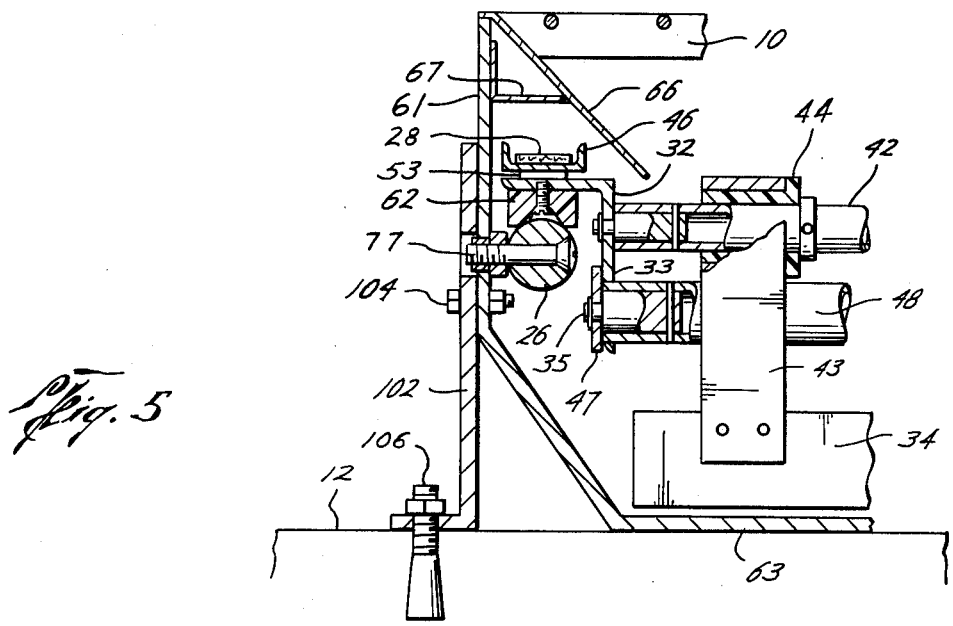
FIG. 5 is an enlarged fragmentary vertical sectional view taken along the line 5—5 of FIG. 1.

Referring now to FIG. 1, there is shown apparatus for removal and recovery of particulate matter. Such apparatus is used preferably with an abrasive blasting system in an enclosed area or building. Blasting work is performed above a grating 10 supported above floor 12 by frameworks 14. Each framework 14 is a separate unit or flight so that as many flights as desired may be used to cover the floor 12. Floor 12 includes a collection channel 16 which is traversed by frameworks 14. As blasting takes place above grating 10, particulate matter falls down through grating 10 to floor 12. To remove the particulate matter from floor 12 each framework 14 is provided with sweep assemblies 18. A typical flight is twenty feet in length, four feet in width, and may have four blade assemblies 18 that are spaced four feet apart.

Each sweep assembly 18 is driven reciprocably by drive assembly 20 connected to idler assembly 21. Drive assembly 20 includes a reversible motor 22 that operates to turn shaft 23 to which sprockets 25 are attached. Chains 27 are carried by sprockets 25 and are attached to the right end of longitudinally extending bar 47 as shown in FIG. 4, and to the end of a belt 28. The belt 28 extends the full length of the flight, and is carried around the idler wheel 29 and connected to the other end of bar 47.

Any suitable means (not shown) may be used in the collection channel 16 to convey the particulate matter in the collection channel to the desired ultimate collection location for disposal or reuse. A typical conveyor means might be a screw conveyor.

Referring now to FIG. 2, there is shown a partial view of one of the flights with two sweep assemblies 18. Framework 14 includes oppositely disposed vertical sections 60, 61 connected by flat bottom plate 63 which is carried by floor 12. On each of vertical sections 60, 61 are mounted rails 26. Rails 26 support a plurality of sweep assemblies 18. Each sweep assembly 18 includes driven sections 30 at each end, slidably mounted on rails 26. A longitudinal channel bar 46 lies on top of and is attached to the sections 30 and runs longitudinally along vertical sections 60, 61. One end of chain 27, as well as belt 28 (not shown in FIG. 2 for clarity) is carried in the groove of channel bar 46.

Rods 42 span plate 63 and are attached at each end to the oppositely disposed driven sections 30. The combination of driven sections 30, channel bar 46, and rods 42 form a rigid structure spanning plate 63 and slidingly engaging rails 26 on oppositely disposed frame sections 60, 61. Hooks 43 hang from rods 42 with sweep blades 34 attached thereto. Drive members 32 also slidingly engage rails 26 between the driven sections 30. Drive members 32 are mounted on rail 26 so that they alternate with driven sections 30, i.e., for each blade assembly 18 there is a driven section 30 carried by rail 26 with drive members 32 therebetween. The spacing between consecutive drive members 32 is greater than the length of driven section 30 so that a gap will be left on rail 26 between each drive member 32 and adjacent driven section 30.

Beneath the drive members 32 on each side, and attached thereto, is a longitudinally extending bar 47. Bars 47 extend almost the length of vertical sections 60, 61 and serve to connect the alternately spaced drive members 32 together. Attached to bars 47 are pivoting rods 48 laterally spanning plate 63. Drive members 32, bars 47, and pivoting rods 48 form a rigid structure spanning plate 63 and slidingly engaging oppositely disposed rails 26.

Referring now to FIG. 3, there is shown a sectional view of adjacent frameworks 14 as taken along lines 3—3 of FIG. 1. Adjacent frameworks 14 include vertical sections 60, 61 supported by bottom plates 63 on floor 12. Vertical sections 60, 61 include sloped portions 65 between the vertical portions and the plate 63, so as to divert any grit or abrasive falling against vertical sections 60, 61 into the blades 34. The entire framework 14 may be pre-fabricated because vertical sections 60, 61 and bottom plate 63 join to form a pan-like structure. Between vertical sections 60, 61 is a structure comprising a rail 70 mounted on base 72. The vertical section 60 may be welded at points 74, 76 to base 72. Rail 70 may be used to support cars to carry the work to be blasted. The grit falling around rail 70 may be recovered through holes 71 in frame members 60, 61.

Deflection shield 66 mounts on the top of each vertical section 60, 61 and is structurally strengthened by angular brace 67. Shield 66 is sloped to divert grit away from the moving frame members 30, 32 and into the swept area. Grating 10 rests on shield 66.

Beneath shield 66, rails 26 are bolted to frame members 60, 61 at 77. Rail 26 is typically a cold-rolled steel bar. A cold-rolled steel bar represents the advantages of presenting a sliding surface of arcuate contour that provides a smaller sliding surface area and thus reduced friction during sliding. Also, if any grit falls on rails 26, the rounded surface allows the grit to fall below into the swept area. Thus, grit does not collect on rail 26 and wear is greatly reduced.

Driven section 30 slidingly engages rail 26 on wear pad 62 which may be attached to driven section 30 by any suitable means, e.g. nylon screws (not shown). Pad 62 is used to provide a more frictionless operation and requires a product that will be self-lubricating and withstand abrasion wear. Pad 62 is typically made of a self-lubricating nylon or an acetyl resin such as Delrin, A Du Pont product, and may even be made from brake linings. Pads 62 are machined so as to have a slight contour to conform to the shape of rail 26. Channel bar 46 is attached to driven section 30 by spacer 53 which may be any suitable materials, as plastic or rubber. The use of spacer 53 allows channel bar 46 to be spaced above drive frame 32. Nylon belt 28 is carried within channel bar 46. Bolted to driven section 30 is rod 42 which spans across bottom plate 63. Blade 34 is freely suspended from rod 42 by means of hooks 43. Bushings 44 are mounted on rod 42 and hooks 43 are mounted thereon, thus providing a pivoting surface. Blade 34 is attached to hooks 43 by bolts 45.

Since drive frame member 32 also slidingly engages rail 26, it is partially hidden by driven frame member 30 in FIG. 3, but is clearly shown in FIG. 5. Bar 47 is attached to drive member 32 by means of bolt 35. Bolt 35 also attaches pivoting rod 48 to drive member 32. Pivoting rod 48 spans across bottom plate 63 beneath rod 42. Hook 43 to which blade 34 is attached also extends around and below pivoting rod 48, as more clearly seen in FIG. 2.

FIG. 5 shows the outer side of a group of flights. Vertical frame section 61 having lower bottom plate 63 is supported by floor 12. Structural strength and stability is added by plate 102 that is attached to frame section 61 and extends longitudinally thereof. Plate 102 may be attached by bolts 104 to frame section 61.

Figure 7:
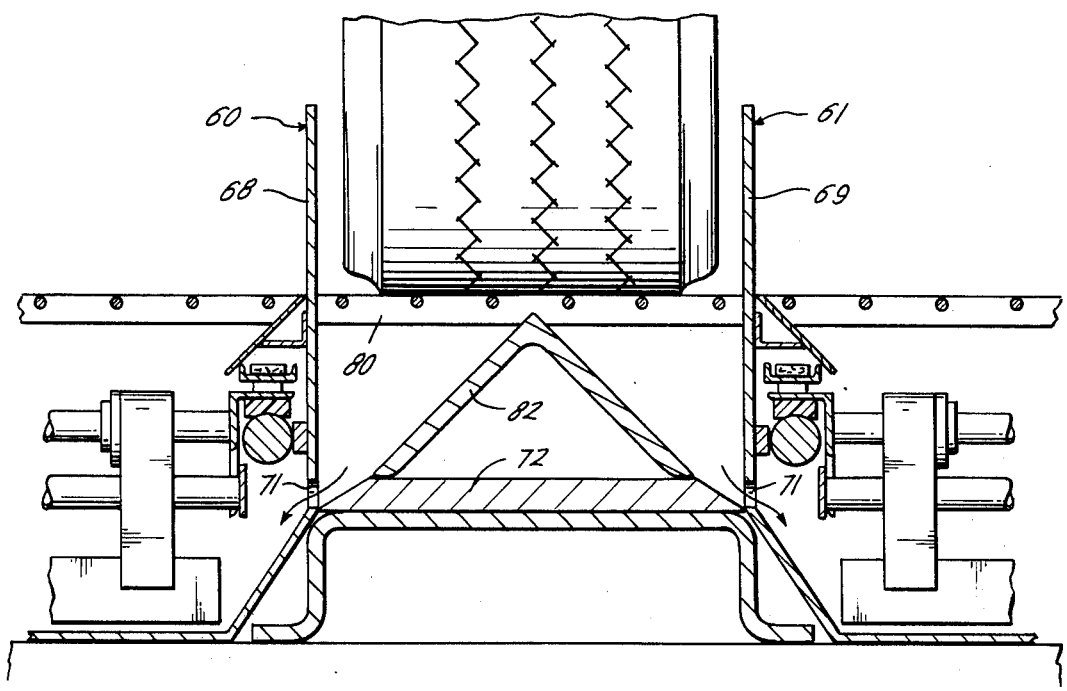
FIG. 7 is an enlarged fragmentary vertical sectional view as in FIG. 3 but showing a further embodiment.

Referring now to FIG. 7, there is shown another embodiment in which adjacent frames are attached together to provide a curbed track therebetween. All elements are the same as in FIG. 3 except that rail 70 has been removed. In its place is a piece of grating 80 that is mounted above a sloped ridge 82. The sloped ridge 82 allows any grit falling through grating 80 to be diverted into holes 71 in frame sections 60, 61 from where it will fall into the swept area and be recovered. The width of grating 80 is just enough to accomodate a tire of a truck or trailer, and therefore grating 80 will be strong enough so that reinforcement should not be needed. The sides of frame sections 60, 61 have been extended by curb portions 68, 69 to serve as curbs to insure that a tire will remain on the track or grating 80.

Figure 6:
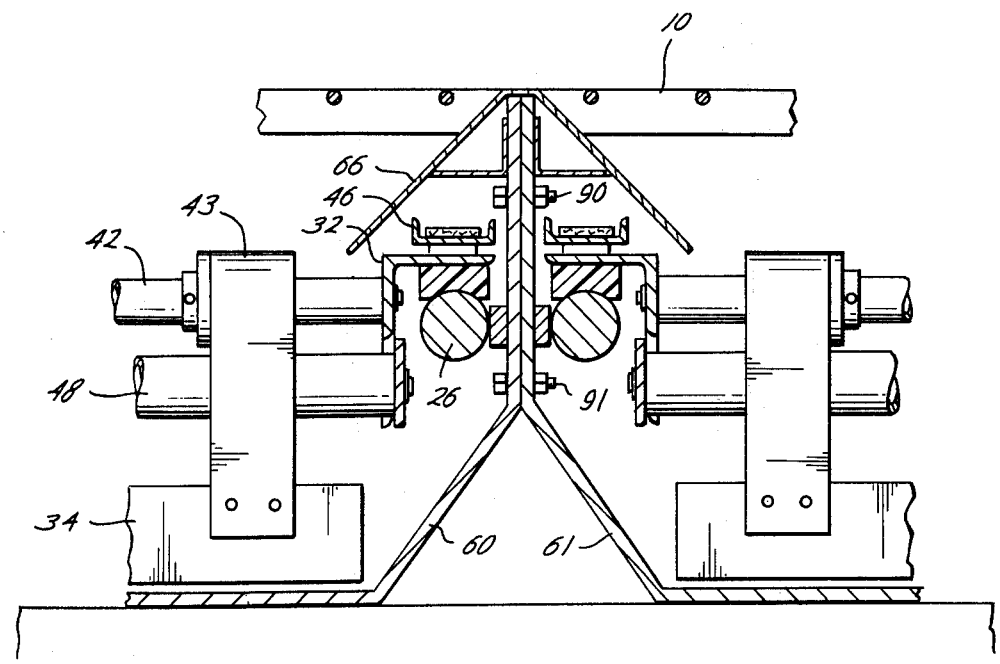
FIG. 6 is an enlarged fragmentary vertical sectional view as in FIG. 3 but showing another embodiment.

Referring now to FIG. 6, there is shown another embodiment in which adjacent flights are attached together with no provisions for a supportive track or rail. All elements are as in FIG. 3 except that rail 70 and base 72 have been eliminated and adjacent frame sections 60, 61 are bolted together as at 90, 91.

In operation, as shown in FIG. 4, drive system 20 is operated to pull drive frame 32 reciprocally along framework 14. FIG. 4 shows the blades sweeping to the left. Initially, the drive frame 32 and driven frame 30 do not engage each other. Drive frame 32 also does not engage channel bar 46 because of spacers 53. Both frames slidingly engage rail 26 but they are spaced apart because the spacing between consecutive drive frame sections 32 is wider than the width of driven frame sections 30. The spacing allows the drive frame 32 to move along rail 26 a short distance during change in direction contacting driven frame section 30. Thus driven frame 30 functions as a clutch and the spacing serves as a lost motion means for pivoting blades 34. When the drive frame 32 is pulled by chain 27 it moves along rail 26 and engages driven frame 30 after moving a distance equal to the spacing between them and then pushes driven frame 30 for the rest of the stroke. During the time the drive frame 32 moves across the spacing, pivoting bar 48 moves relative to the driven frame rod 42 which is stationary. Since blade 34 is hooked over rod 42 and around pivoting rod 48 by hooks 43, blade 34 will pivot as rod 48 moves relative to bar 42. As seen in FIG. 4, the blades to the left of collection channel 16 are pivoted away from bottom plate 63 while those to the right of collection channel 16 are pivoted into sweeping engagement with bottom plate 63. Generally, the collection channel 16 will be under framework 14 at about its midpoint. Thus, as half the blades approach collection channel 16, the other half will be moving away from collection channel 16. The relative location of pivoting rods 48 of drive frame 32 to rods 42 of driven frame 30 determines the pivoting of blades 34. At the end of a stroke, motor 22 (not shown in FIG. 4) will reverse causing sprocket 25 to reverse and thus to pull chain 27 in the opposite direction. Chain 27 then pulls drive frame 32 in the opposite direction. As drive frame 32 reverses and moves along rail 26 it will traverse the space between it and the now stationary driven frame 30. During this time the relative movement of pivoting rods 48 and rods 42 will pivot blades 34 either away from bottom plate 63 or into sweeping engagement with bottom plate 63. A typical stroke length is five feet and chain 27 must be somewhat longer to insure constant engagement with sprocket 25. Nylon belt 28 is attached to chain 27 and is carried by channel bar 46 and idler wheel 29 and attaches to bar 47 at the opposite end from chain 27.

Many other variations of the invention will be apparent to those skilled in the art. Accordingly, the invention is not to be considered to be limited to the specific embodiments shown and described herein, but only as set forth in the appended claims.

I claim:

1. Apparatus for sweeping particulate matter across a floor comprising
 a pair of horizontal parallel, spaced-apart, support members,
 a rail mounted on each support member, spaced upwardly from the lower edge of the support member and extending longitudinally thereof,
 first and second frames longitudinally movably supported on said rails, each frame including a plurality of rods spanning the space between said rails, said frames having interspaced rail engaging portions allowing relative longitudinal movement of said frames along said rails,
 a transverse, horizontally extending sweeping blade removably hanging upon, and unattached to, each of the rods of the first frame, each said blade having a portion engageable by a rod of the second frame upon relative longitudinal movement of said frames, whereby upon continued relative longitudinal movement the blade is pivoted about the rod of the first frame,
 drive means operably connected to one of said frames adapted to cause said one frame to move longitudinally of said rails, and
 cooperable engagement means on said frames for engagement of said one frame with the other frame, upon longitudinal movement of the said one frame an amount greater than that necessary to pivot the blades, to cause longitudinal movement of said other frame.

2. Apparatus as defined by claim 1 wherein the sweeping blades are suspended by means of hooks hanging on the rods.

3. Apparatus as defined by claim 2 wherein the rails are cylindrical.

4. Apparatus for sweeping particulate matter across a floor comprising
 support means,
 rail means mounted on said support means and extending longitudinally thereof,
 first and second frames longitudinally movably supported on said rail means, said frames having interspaced rail means engaging portions allowing relative longitudinal movement of said frames along said rail means,
 a transverse, horizontally extending sweeping blade removably hanging upon, and unattached to, the first frame, each said blade having a portion engageable by an element of the second frame upon relative longitudinal movement of said frames, whereby upon continued relative longitudinal movement the blade is pivoted about a transverse, horizontal axis,
 drive means operably connected to one of said frames adapted to cause said one frame to move longitudinally of said rail means, and
 cooperable engagement means on said frames for engagement of said one frame with the other frame, upon longitudinal movement of the said one frame an amount greater than that necessary to pivot the blades, to cause longitudinal movement of said other frame.

5. Apparatus for sweeping particulate matter across a floor comprising
 a pair of horizontal parallel, spaced-apart, support members,
 a rail mounted on each support member, spaced upwardly from the lower edge of the support member and extending longitudinally thereof,
 first and second frames longitudinally movably supported on said rails, each frame including a plurality of blade engaging members between said rails, said frames having interspaced rail engaging portions allowing relative longitudinal movement of said frames along said rails,
 a transverse, horizontally extending sweeping blade removably hanging upon, and unattached to, each of the blade engaging members of the first frame, each said blade having a portion engageable by a blade engaging member of the second frame upon relative longitudinal movement of said frames, whereby upon continued relative longitudinal movement the blade is pivoted about the blade engaging member of the first frame,
 drive means operably connected to one of said frames adapted to cause said one frame to move longitudinally of said rails, and
 cooperable engagement means on said frames for engagement of said one frame with the other frame, upon longitudinal movement of the said one frame an amount greater than that necessary to pivot the blades, to cause longitudinal movement of said other frame.

6. Apparatus as defined by claim 5 wherein the sweeping blades are suspended by means of hooks hanging on the rods.

7. Apparatus as defined by claim 6 wherein the rails are cylindrical.

* * * * *

UNITED STATES PATENT AND TRADEMARK OFFICE
CERTIFICATE OF CORRECTION

PATENT NO. : 4,018,329
DATED : April 19, 1977
INVENTOR(S) : James Dean Jarvis

It is certified that error appears in the above-identified patent and that said Letters Patent are hereby corrected as shown below:

Column 3, line 49: At the beginning of the line, delete "A" and insert --a--.

Column 4, line 41: After "direction", insert --before--.

Signed and Sealed this nineteenth Day of July 1977

[SEAL]

Attest:

RUTH C. MASON
Attesting Officer

C. MARSHALL DANN
Commissioner of Patents and Trademarks